(12) United States Patent
Lee et al.

(10) Patent No.: US 10,816,131 B2
(45) Date of Patent: Oct. 27, 2020

(54) LIFTABLE SCREEN STAND

(71) Applicants: Mong-Yu Lee, Kaohsiung (TW);
Chi-Jun Lee, Kaohsiung (TW)

(72) Inventors: Mong-Yu Lee, Kaohsiung (TW);
Chi-Jun Lee, Kaohsiung (TW)

( * ) Notice: Subject to any disclaimer, the term of this patent is extended or adjusted under 35 U.S.C. 154(b) by 0 days.

(21) Appl. No.: 16/261,025

(22) Filed: Jan. 29, 2019

(65) Prior Publication Data
US 2020/0240575 A1 Jul. 30, 2020

(51) Int. Cl.
*A47B 9/10* (2006.01)
*F16M 11/04* (2006.01)
*G06F 1/16* (2006.01)
*F16M 13/02* (2006.01)

(52) U.S. Cl.
CPC ........ *F16M 11/046* (2013.01); *F16M 13/022* (2013.01); *G06F 1/1607* (2013.01); *A47B 9/10* (2013.01)

(58) Field of Classification Search
CPC ........ F16M 11/26; F16M 11/22; F16M 11/24; A47C 3/30; A47B 9/10; B66F 3/10
USPC ............... 248/132, 161, 157, 188.2, 188.5; 126/DIG. 6; 211/133.1; 269/17; 254/313, 413, 7 B, 10 R
See application file for complete search history.

(56) References Cited

U.S. PATENT DOCUMENTS

| | | | | |
|---|---|---|---|---|
| 4,061,304 A | * | 12/1977 | Schattmaier | A47C 3/30 248/404 |
| 5,366,275 A | * | 11/1994 | Sulzer | A47C 3/30 248/161 |
| 2004/0004165 A1 | | 1/2004 | Hong et al. | |
| 2007/0221796 A1 | * | 9/2007 | Silverman | A61M 5/1415 248/161 |
| 2015/0159804 A1 | | 6/2015 | Bowman et al. | |
| 2016/0258573 A1 | * | 9/2016 | Goldish | F16M 11/42 |

FOREIGN PATENT DOCUMENTS

TW M472207 U 2/2014
TW M482771 U 7/2014

* cited by examiner

*Primary Examiner* — Alfred J Wujciak
(74) *Attorney, Agent, or Firm* — Fredrikson & Byron, P.A.

(57) ABSTRACT

The liftable screen stand has a base assembly, an elevating device, and an assembling device. The elevating device is mounted on the base assembly and has a guiding tube, an elevating tube, a supporting tube, a pedal seat, a pedal, a pushing rod and a pneumatic cylinder. The elevating tube is movable along the guiding tube. The supporting tube is disposed in the guiding tube. The pedal seat is mounted in the base assembly. The pedal is mounted on the pedal seat. The pushing rod abuts against the pedal. The pneumatic cylinder has a gas spring, an activating valve, and an elevatable tube. The gas spring is fixed at the supporting tube. The activating valve is mounted to the gas spring. The elevatable tube is mounted to the gas spring and is fixed with the elevating tube. The assembling device is mounted to the elevating tube.

9 Claims, 7 Drawing Sheets

LIFTABLE SCREEN STAND

BACKGROUND OF THE INVENTION

1. Field of the Invention

The present invention relates to a screen stand, and more particularly to a liftable screen stand that can lift an LCD monitor to a higher position with an elevating device and can reduce the cost of use.

2. Description of Related Art

The size of a liquid-crystal display (LCD) monitor is getting bigger with the advance of modern technology. To fix and adjust a position of the LCD monitor, the LCD monitor is often mounted on a conventional screen stand. The conventional screen stand has a pneumatic cylinder and an assembling device. The pneumatic cylinder is mounted within the conventional screen stand, and the assembling device is mounted to the pneumatic cylinder. The LCD monitor is mounted to the assembling device. By operating the pneumatic cylinder, the assembling device can ascend to a higher position or descend to a lower position. The position of the LCD monitor can be adjusted thereby.

The pneumatic cylinder of the conventional screen stand can only pull the assembling device to a height of 100 centimeters (cm) above a ground. If the size of the LCD monitor is too big, a lower part of the LCD monitor may not be seen due to the limited height lifting range of the pneumatic cylinder. To increase the height lifting range of the pneumatic cylinder, bigger capacity for gas is needed. It takes complex technique and costs too much to make a pneumatic cylinder with bigger capacity for gas. Overall, it costs too much to make a conventional screen stand with a pneumatic cylinder with a larger height lifting range.

SUMMARY OF THE INVENTION

The main objective of the present invention is to provide a liftable screen stand that can lift an LCD monitor to a higher position without having to cost much.

The liftable screen stand in accordance with the present invention has a base assembly, an elevating device, and an assembling device. The elevating device is mounted on the base assembly and has a hollow guiding tube, an elevating tube, a hollow supporting tube, a pedal seat, a pedal, a pushing rod, and a pneumatic cylinder. The guiding tube is mounted on the base assembly and has an interior and an outer surface. The elevating tube is mounted to the guiding tube, and is movable along the guiding tube. The supporting tube is mounted on the base assembly, is disposed in the interior of the guiding tube, and has an interior. The pedal seat is mounted in a lower half of the base assembly.

The pedal is pivotably mounted on the pedal seat and has a passive portion and a pedaled portion. The passive portion is disposed at an end of the pedal and is below the supporting tube. The pedaled portion is connected to the passive portion and is located at an exterior of the base assembly. The pushing rod is disposed in the interior of the supporting tube, passes through the base assembly and abuts against the pedal. The pneumatic cylinder is mounted to an inner top surface of the elevating tube, is disposed in the interior of the guiding tube, and has a gas spring, an activating valve, and an elevatable tube. The gas spring is fixed at a top of the supporting tube. The activating valve is mounted at a bottom of the gas spring. The elevatable tube is movably mounted to the gas spring and has a top end fixed on the inner top surface of the elevating tube. The assembling device is mounted to the elevating tube of the elevating device and is at a top of the elevating tube.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
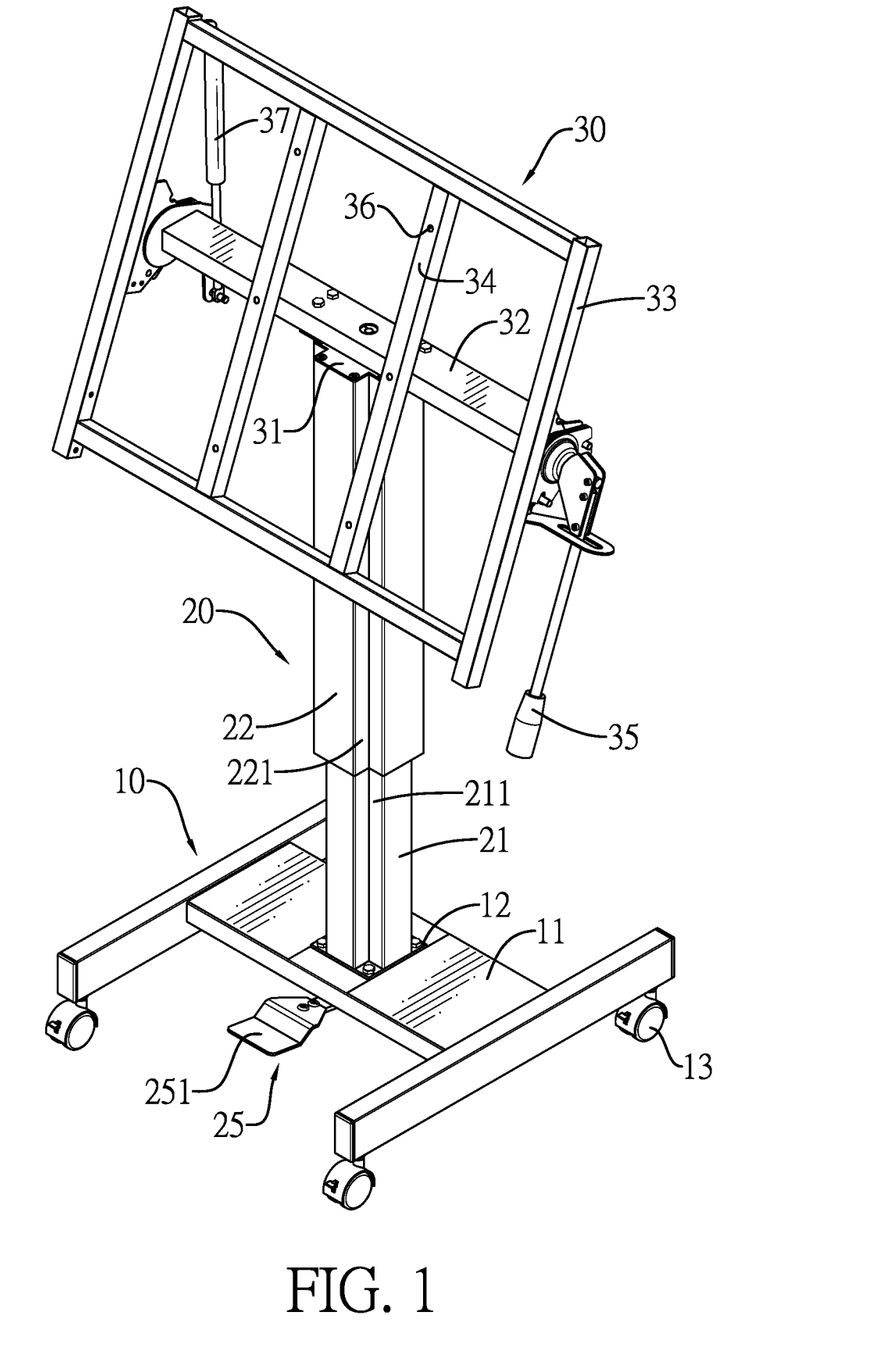
FIG. 1 is a perspective view of a liftable screen stand in accordance with the present invention.
Figure 2:
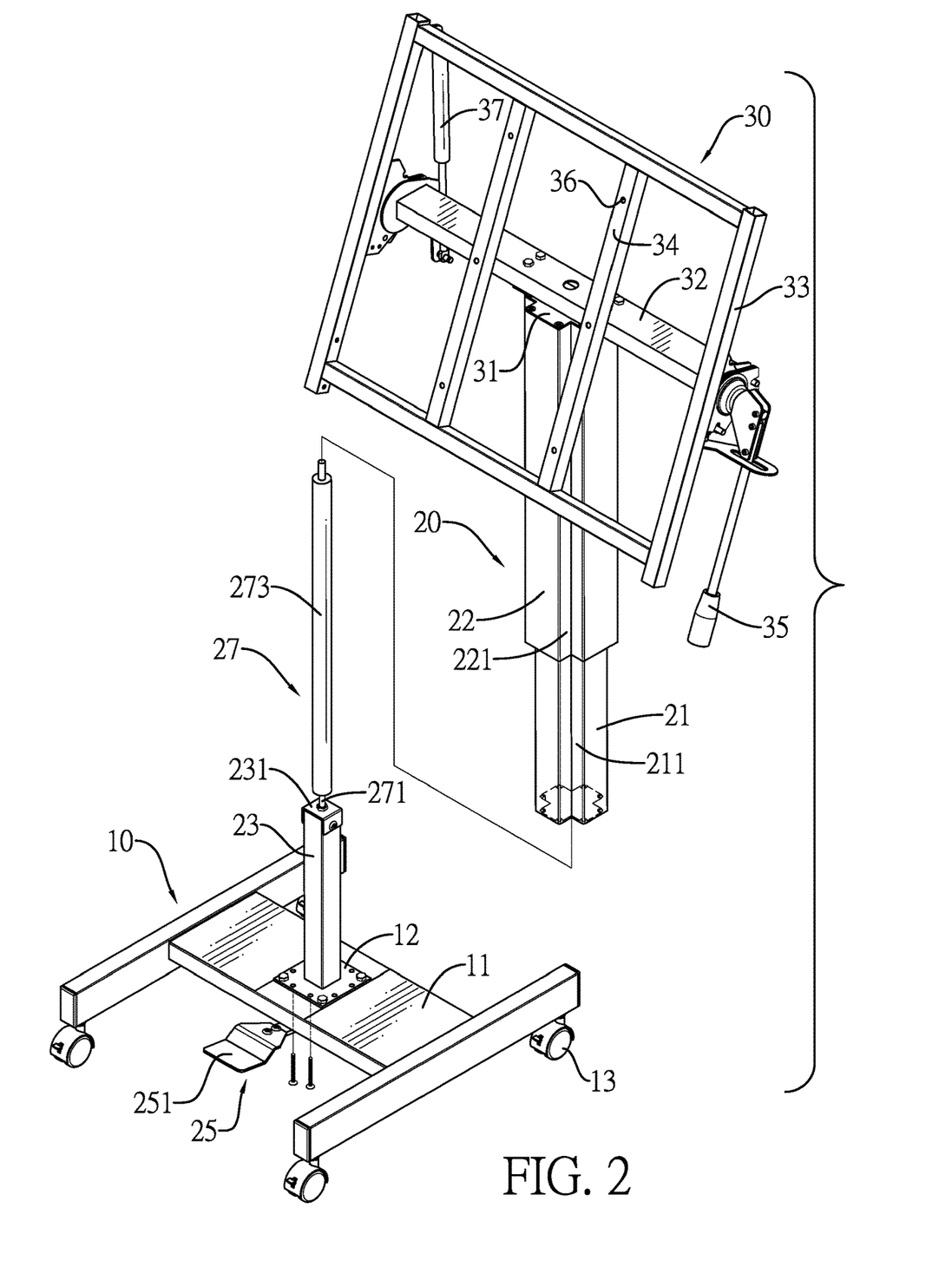
FIG. 2 is an exploded perspective view of the liftable screen stand in FIG. 1.
Figure 3:
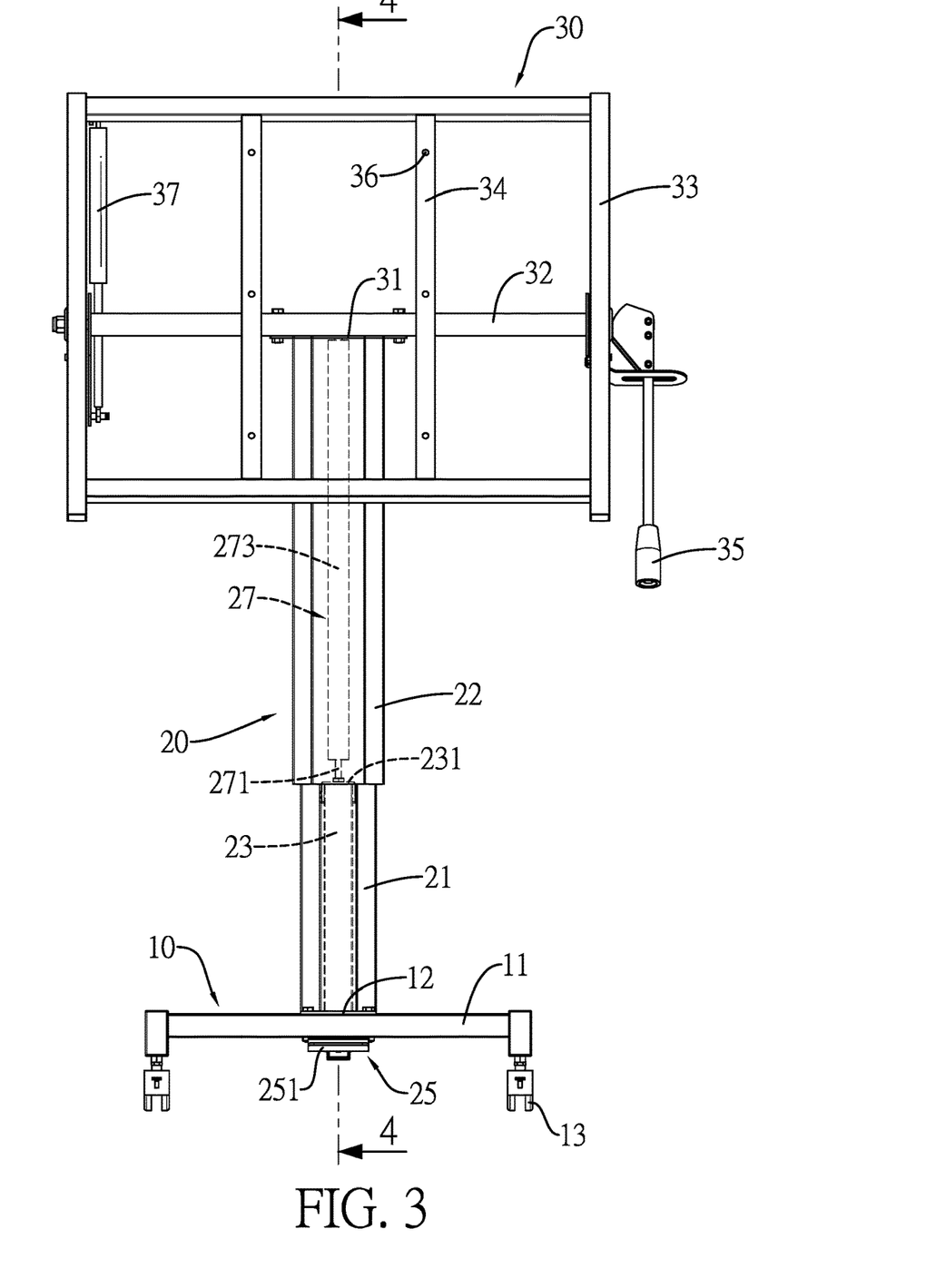
FIG. 3 is a front side view of the liftable screen stand in FIG. 1.

With reference to FIGS. 1 to 3, a liftable screen stand in accordance with the present invention comprises a base assembly 10, an elevating device 20, and an assembling device 30.

With reference to FIGS. 1 to 3, the base assembly 10 has a base 11, a fixing board 12, and four wheels 13. The fixing board 12 is mounted on the base 11. The fixing board 12 can be fixed on the base 11 by fastening four screws through the fixing board 12 onto the base 11, which provides stability to the fixing board 12. The four wheels 13 are mounted separately on a bottom of the base 11 and arranged in a matrix. The four wheels 13 enable the base 11 to move, which enhances the mobility of the present invention.

With reference to FIGS. 1 to 3 and 6, the elevating device 20 is mounted on the base assembly 10 and has a guiding tube 21, an elevating tube 22, a supporting tube 23, a pedal seat 24, a pedal 25, a pushing rod 26, and a pneumatic cylinder 27. The guiding tube 21 is hollow, is mounted on the fixing board 12 of the base assembly 10, and has an interior, an outer surface, and multiple first caved portions 211. The multiple first caved portions 211 are disposed on the outer surface of the guiding tube 21 at equi-angular intervals. The guiding tube 21 can be fixed on the fixing board 12 by fastening eight screws through the base 11 and the fixing board 12 to a bottom of the guiding tube 21. By fastening the eight screws, the guiding tube 21 is fixed on the fixing board 12 firmly.

Figure 6:
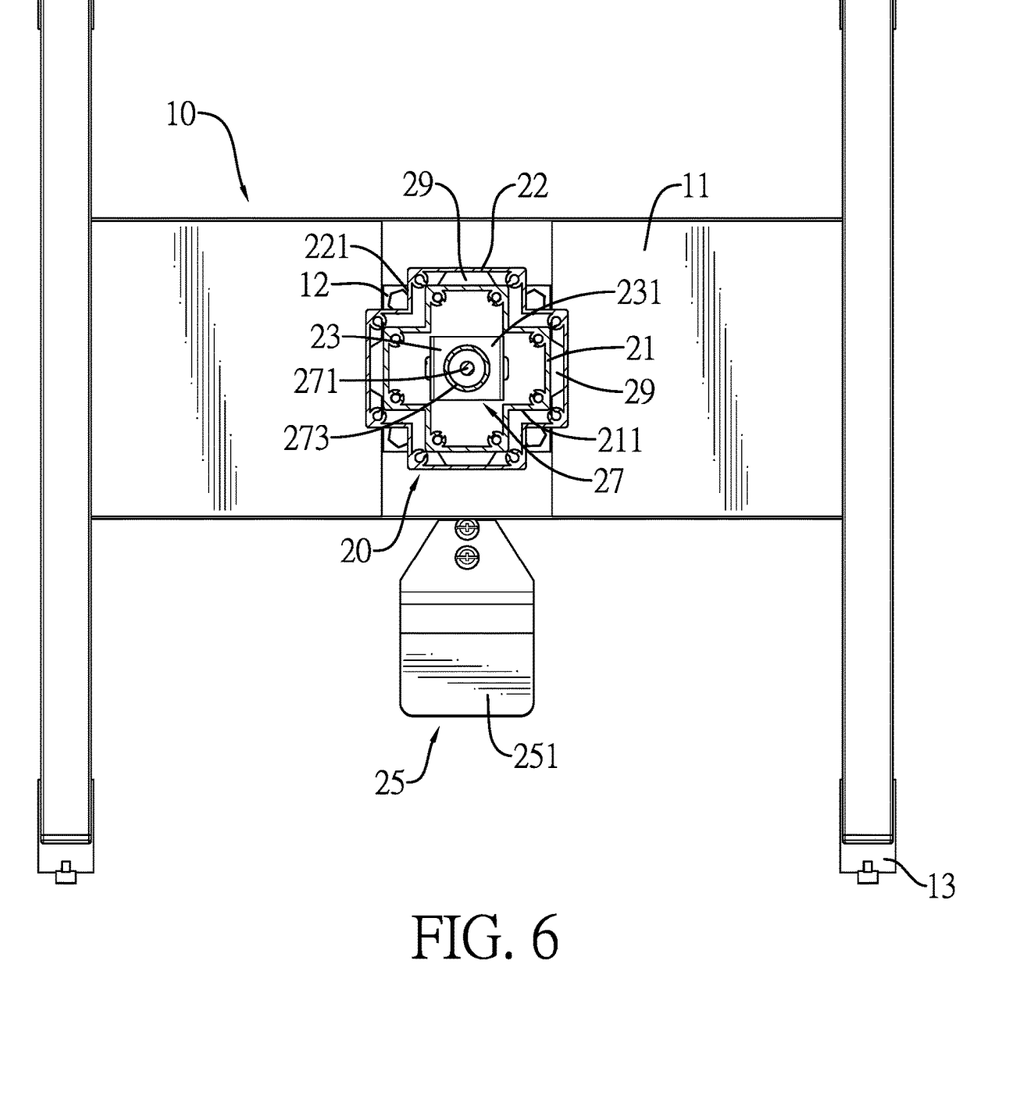
FIG. 6 is a cross-sectional top side view of the liftable screen stand along a line 6-6 in FIG. 4.
Figure 7:
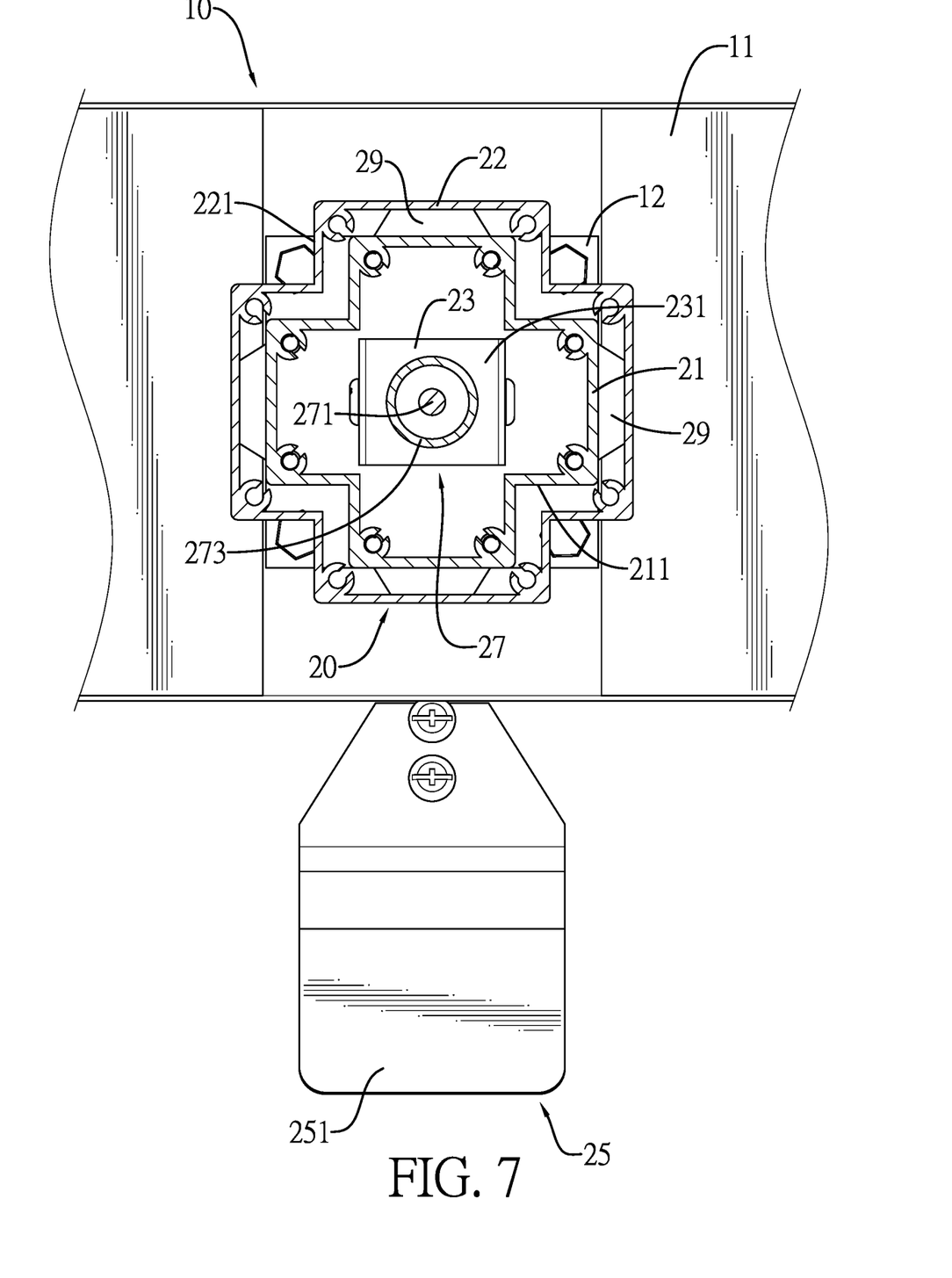
FIG. 7 is an enlarged cross-sectional top side view of the liftable screen stand along the line 6-6 in FIG. 6.

The elevating tube 22 is mounted to the guiding tube 21, is movable along the guiding tube 21, and has an outer surface and multiple second caved portions 221. The multiple second caved portions 221 are disposed on the outer surface of the elevating tube 22 at equi-angular intervals. Each one of the multiple second caved portions 221 is disposed to a respective one of the multiple first caved portions 211 of the guiding tube 21. As shown in FIGS. 6 and 7, cross-sections of the guiding tube 21 and the elevating tube 22 are in the shape of a crisscross, which reduces the stress born by the guiding tube 21 and the elevating tube 22 when stricken, and enhances the structural strength of the guiding tube 21 and the elevating tube 22. In this way, the cost of the material of the guiding tube 21 and the elevating tube 22 also reduces due to smaller thickness needed to manufacture the guiding tube 21 and the elevating tube 22.

The supporting tube 23 is hollow, is mounted on the fixing board 12 of the base assembly 10, is disposed in the interior of the guiding tube 21, and has an interior. Furthermore, the supporting tube 23 has a cover 231 mounted at a top of the supporting tube 23.

Figure 4:
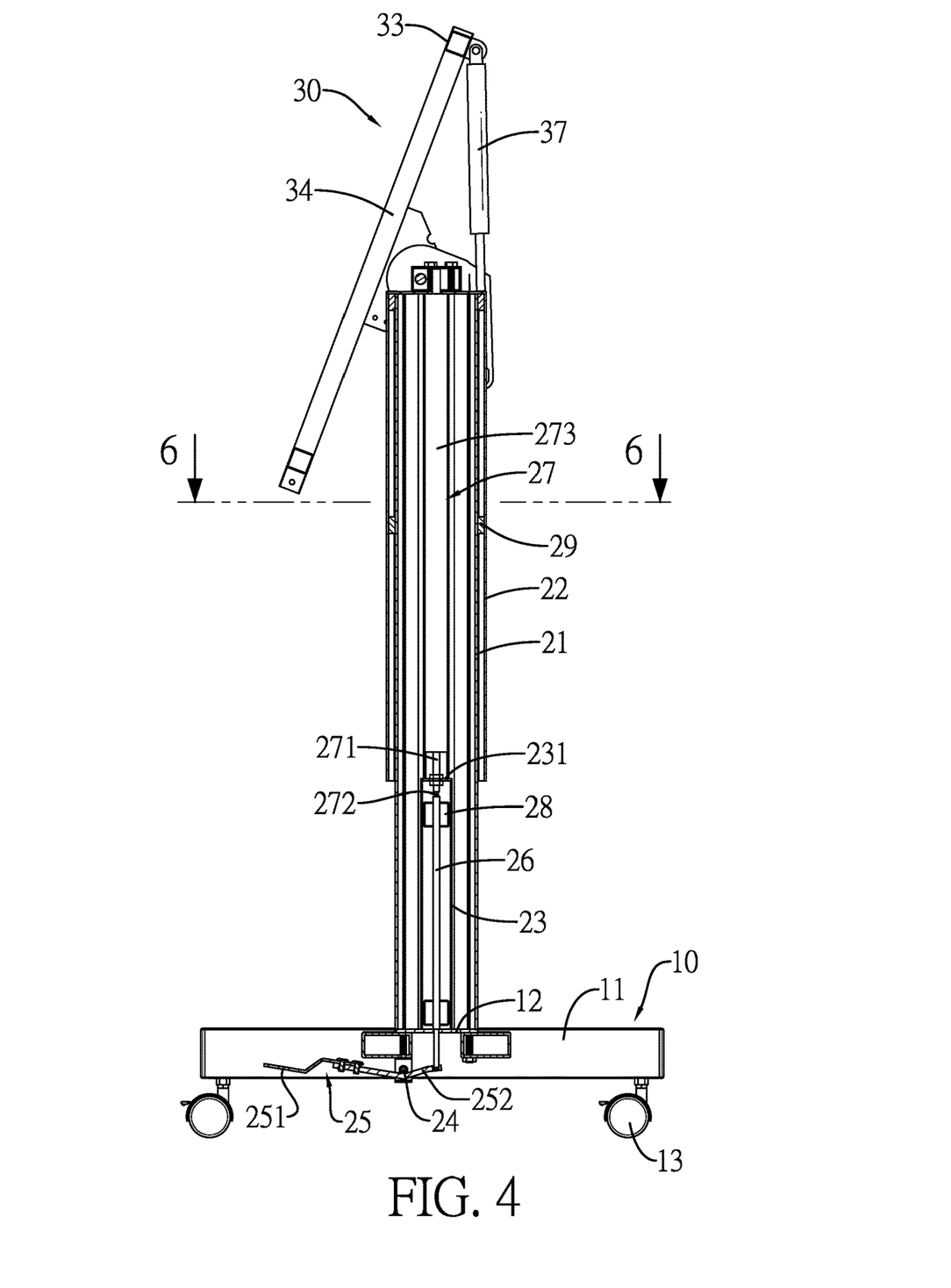
FIG. 4 is a side view in partial section of the liftable screen stand along a line 4-4 in FIG. 3.

As shown in FIG. 4, the pedal seat 24 is mounted in a lower half of the base 11 of the base assembly 10. The pedal 25 is pivotably mounted on the pedal seat 24 and has a passive portion 252 and a pedaled portion 251. The passive portion 252 is disposed at an end of the pedal 25, is pivotably mounted on the pedal seat 24, and is disposed below the supporting tube 23. As shown in FIGS. 2 and 4, the pedaled portion 251 is connected to the passive portion 252 and is located at an exterior of the base 11 of the base assembly 10. The pushing rod 26 is disposed in the interior of the supporting tube 23, passes through the fixing board 12, and abuts against the passive portion 252 of the pedal 25.

The pneumatic cylinder 27 is mounted to an inner top surface of the elevating tube 22 and is disposed in the interior of the guiding tube 21. The pneumatic cylinder 27 has a gas spring 271, an activating valve 272, and an elevatable tube 273. The gas spring 271 is fixed at the cover 231 of the supporting tube 23. The activating valve 272 is mounted at a bottom of the gas spring 271. The elevatable tube 273 is movably mounted to the gas spring 271 and has a top end. The top end of the elevatable tube 273 is fixed on the inner top surface of the elevating tube 22.

Moreover, as shown in FIGS. 4, 6, and 7, the elevating device 20 has at least one fixing element 28 and multiple stabilizing elements 29. The at least one fixing element 28 is disposed in the interior of the supporting tube 23, and the pushing rod 26 passes through the at least one fixing element 28. The at least one fixing element 28 surrounds the pushing rod 26 in the supporting tube 23 and prevents the pushing rod 26 from hitting against the supporting tube 23. The multiple stabilizing elements 29 are disposed on the outer surface of the guiding tube 21 and abut against an inner surface of the elevating tube 22, so that the elevating tube 22 moves along the guiding tube 21 smoothly and stably. The multiple stabilizing elements 29 also enhance the structural strength of the elevating device 20.

With reference to FIGS. 1 to 3, the assembling device 30 is mounted to the elevating tube 22 of the elevating device 20 and is located at a top of the elevating tube 22. The assembling device 30 has a fastening board 31, an assembling bar 32, an assembling frame 33, two mounting elements 34, an angle-adjusting handle 35, and at least one dashpot 37. The fastening board 31 is mounted to the top of the elevating tube 22. The assembling bar 32 is mounted on the fastening board 31. The assembling frame 33 is pivotably mounted to the assembling bar 32.

The assembling frame 33 has two mounting bars disposed at a spaced interval on the assembling frame 33. The two mounting elements 34 are mounted to the two mounting bars of the assembling frame 33, are disposed in an inner side of the assembling frame 33, and are disposed at a spaced interval. Each one of the two mounting elements 34 has multiple mounting holes 36. The multiple mounting holes 36 are disposed on one of the two mounting elements 34 and are at spaced intervals with one another. Different ones of the mounting holes 36 are selected according to the size of an LCD monitor that is to be mounted on the assembling frame 33. With reference to FIG. 3, if the size of the LCD monitor is small, four of the multiple mounting holes 36 adjacent to each other are chosen for mounting the LCD monitor. If the size of the LCD monitor is large, the two mounting holes 36 on an upper side and the two mounting holes 36 on a lower side are chosen for mounting the LCD monitor. The angle-adjusting handle 35 is pivotably mounted to the assembling bar 32, is mounted to the assembling frame 33, and is located at a side of the assembling frame 33. Each of the at least one dashpot 37 has two ends. One of the two ends of the dashpot 37 is mounted to the assembling frame 33, and the other one of the two ends of the dashpot 37 is mounted to the assembling bar 32.

Figure 5:
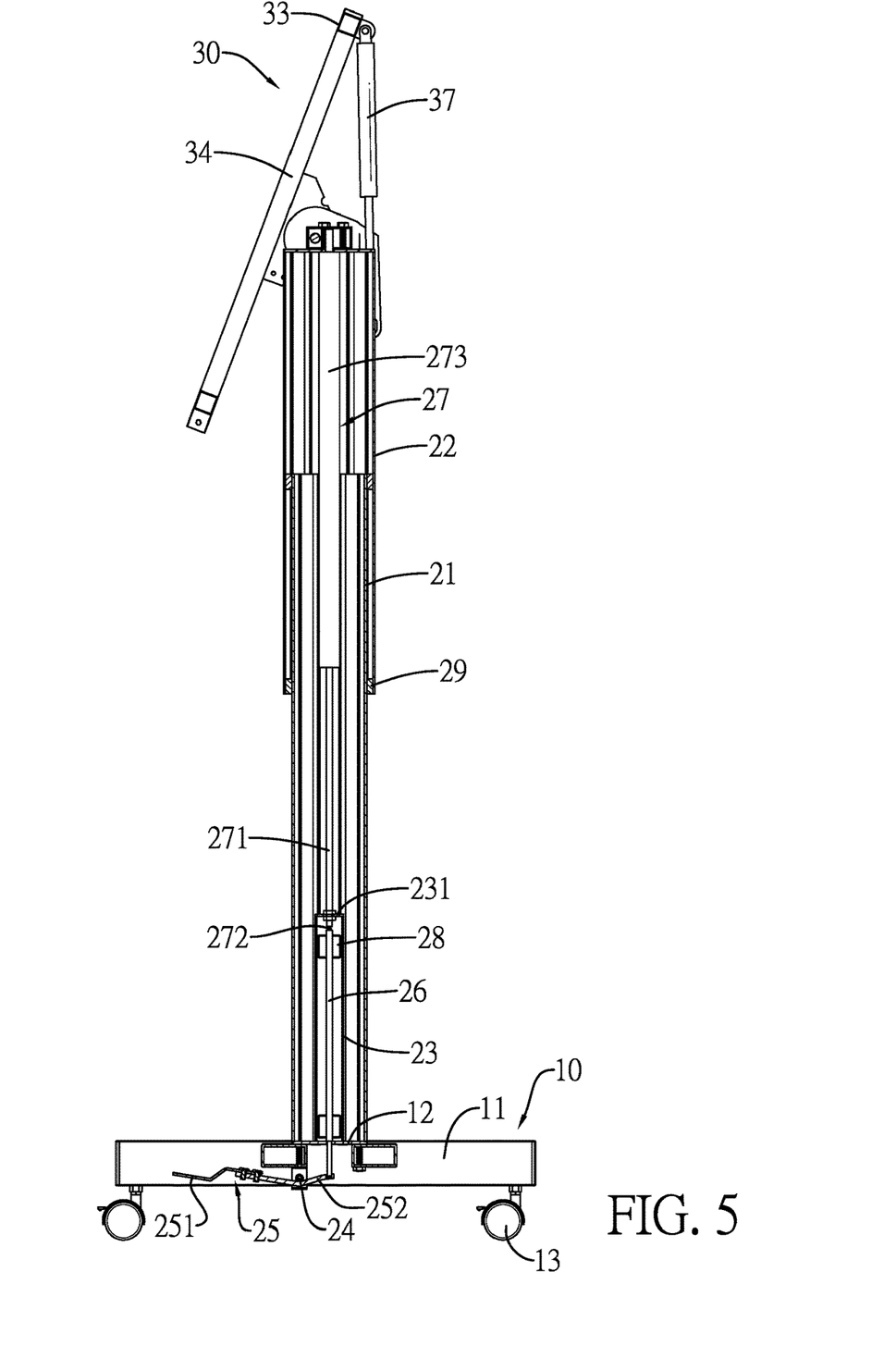
FIG. 5 is an operational side view in partial section of the liftable screen stand along the line 4-4 in FIG. 3, showing a lifted status of the liftable screen stand.

As shown in FIGS. 2, 3, and 5, hold the angle-adjusting handle 35 and pivot the angle-adjusting handle 35 relative to the assembling bar 32. Then the assembling frame 33 pivots relative to the assembling bar 32 as well. When the assembling frame 33 is pivoting, the at least one dashpot 37 provides the assembling frame 33 with a damping effect. The damping effect prevents an LCD frame from striking the assembling frame 33 while the LCD frame and the assembling frame 33 are pivoting. When the assembling frame 30 is horizontal, it can be utilized as a conference table or a drawing desk. People can gather around the LCD monitor for discussion. When the assembling frame 30 is vertical, the LCD monitor can be used for announcement or advertising.

With reference to FIGS. 2, 4 and 5, the LCD monitor can be mounted to the multiple mounting holes 36 of the two mounting elements 34. To lift the LCD monitor, pedal the pedaled portion 251 of the pedal 25, and then the pedaled portion 251 descends and the passive portion 252 ascends. Ascending, the passive portion 252 pushes the pushing rod 26 upwardly. Then the pushing rod 26 pushes the activating valve 272 of the pneumatic cylinder 27. Being activated, the activating valve 272 makes the elevatable tube 273 move upwardly relative to the gas spring 271. As the top end of the elevatable tube 273 is fixed on the inner top surface of the elevating tube 22, the elevating tube 22 elevates as well. Being mounted to the elevating tube 22, the assembling device 30 rises to a higher position.

When the assembling device 30 rises to a desired position, stop pedaling the pedaled portion 251. Then the elevatable tube 273, the elevating tube 22, and the assembling device 30 stop moving and are positioned at the desired position. The position of the LCD monitor can be lifted thereby. To lower the position of the LCD monitor, pedal the pedaled portion 251. Then the passive portion 252 pushes the pushing rod 26 upwardly and the pushing rod 26 activates the activating valve 272. At the same time, press the LCD monitor or the assembling device 30 downwardly until the LCD monitor reaches a desired position. Then stop pedaling the pedaled portion 251. Overall, the elevating tube 22 and the assembling device 30 can move upwardly or downwardly by pedaling the pedaled portion 251 of the pedal 25. The liftable screen stand in accordance with the present invention can lift the LCD monitor to a higher or a lower position quickly and conveniently.

The supporting tube 23 and the pushing rod 26 lift an initial position of the pneumatic cylinder 27. So the pneumatic cylinder 27, the elevating tube 22, and the assembling device 30 can reach a higher height than that of the pneumatic cylinder and the assembling device of the conventional screen stand. The LCD monitor mounted on the present invention can reach a higher height than that of the LCD monitor mounted on the conventional screen stand as well. Therefore, the LCD monitor of a big size can be mounted on the liftable screen stand without being blocked from sight, and the whole screen can be watched clearly. Overall, the assembling device 30 and the LCD monitor can reach a higher position by the supporting tube 23 and the pushing rod 26 without using a pneumatic cylinder with a larger height lifting range, which lowers the cost.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A liftable screen stand comprising:
    a base assembly;
    an elevating device mounted on the base assembly and having
        a guiding tube being hollow, mounted on the base assembly, and having
            an interior; and
            an outer surface;
        an elevating tube mounted to the guiding tube and being movable along the guiding tube;
        a supporting tube being hollow, mounted on the base assembly, disposed in the interior of the guiding tube, and having an interior;
        a pedal seat mounted in a lower half of the base assembly;
        a pedal pivotably mounted on the pedal seat and having
            a passive portion disposed at an end of the pedal seat and disposed below the supporting tube; and
            a pedaled portion connected to the passive portion and located at an exterior of the base assembly;
        a pushing rod disposed in the interior of the supporting tube, passing through the base assembly, and abutting against the passive portion of the pedal; and
        a pneumatic cylinder mounted to an inner top surface of the elevating tube, disposed in the interior of the guiding tube, and having
            a gas spring fixed at a top of the supporting tube;
            an activating valve mounted at a bottom of the gas spring; and
            an elevatable tube movably mounted to the gas spring and having
                a top end fixed on the inner top surface of the elevating tube; and
    an assembling device for supporting a screen mounted to the elevating tube of the elevating device and being at a top of the elevating tube;
    wherein lifting the screen stand, push the pedaled portion in a downwardly direction for the passive portion to push the pushing rod upwardly, the pushing rod then pushes the activating valve of the pneumatic cylinder to move the elevating tube upwardly for rising the assembly device to a higher position.

2. The liftable screen stand as claimed in claim 1, wherein the elevating device has at least one fixing element disposed in the interior of the supporting tube, and the pushing rod passes through the at least one fixing element.

3. The liftable screen stand as claimed in claim 1, wherein the assembling device has
    a fastening board mounted to the top of the elevating tube;
    an assembling bar mounted on the fastening board;
    an assembling frame pivotably mounted to the assembling bar;
    two mounting elements mounted to the assembling frame, disposed in an inner side of the assembling frame, and each one of the two mounting elements having multiple mounting holes disposed at spaced intervals with one another;
    an angle-adjusting handle pivotably mounted to the assembling bar and located at a side of the assembling frame; and
    at least one dashpot mounted to the assembling frame and the assembling bar.

4. The liftable screen stand as claimed in claim 1, wherein the base assembly has
    a base; and
    a fixing board mounted on the base;
    the guiding tube is mounted on the fixing board of the base assembly; and
    the pushing rod is disposed in the interior of the supporting tube, passes through the fixing board of the base assembly, and abuts against the passive portion of the pedal.

5. The liftable screen stand as claimed in claim 4, wherein the fixing board is fixed on the base by fastening four screws through the fixing board onto the base, and the guiding tube is fixed on the fixing board by fastening eight screws through the base and the fixing board to a bottom of the guiding tube.

6. The liftable screen stand as claimed in claim 1, wherein
    the guiding tube has multiple first caved portions disposed on the outer surface of the guiding tube at equi-angular intervals; and
    the elevating tube has multiple second caved portions disposed on an outer surface of the elevating tube at equi-angular intervals, and each one of the multiple second caved portions is disposed to a respective one of the multiple first caved portions of the guiding tube.

7. The liftable screen stand as claimed in claim 1, wherein the elevating device has multiple stabilizing elements disposed on the outer surface of the guiding tube and abutting against an inner surface of the elevating tube.

8. The liftable screen stand as claimed in claim 1, wherein the base assembly has four wheels mounted separately on a bottom of the base and arranged in a matrix.

9. The liftable screen stand as claimed in claim 1, wherein
    the supporting tube has a cover mounted at the top of the supporting tube; and
    the gas spring is fixed at the cover of the supporting tube.

* * * * *